United States Patent [19]

Detweiler et al.

[11] Patent Number: 5,065,979
[45] Date of Patent: Nov. 19, 1991

[54] CONSTANT CURRENT VACUUM REGULATOR

[75] Inventors: Charles A. Detweiler, Durand; Richard A. Schultz, Troy, both of Mich.

[73] Assignee: Lectron Products, Inc., Rochester Hills, Mich.

[21] Appl. No.: 595,201

[22] Filed: Oct. 10, 1990

Related U.S. Application Data

[63] Continuation of Ser. No. 463,470, Jan. 10, 1990, abandoned.

[51] Int. Cl.⁵ ............................................. F16K 31/06
[52] U.S. Cl. ................................ 251/129.16; 137/82; 137/907; 251/129.18; 251/129.21
[58] Field of Search .................. 137/82, 907; 251/129.16, 129.18, 129.21

[56] References Cited

U.S. PATENT DOCUMENTS

| | | |
|---|---|---|
| 3,433,256 | 3/1969 | Stillhard et al. . |
| 3,529,620 | 9/1970 | Heiber . |
| 3,982,554 | 9/1976 | Saito et al. ............................ 137/82 |
| 4,522,371 | 6/1985 | Fox et al. . |
| 4,534,375 | 8/1985 | Fox . |
| 4,567,910 | 2/1986 | Slavin et al. . |
| 4,610,428 | 9/1986 | Fox ................................. 251/129.16 |
| 4,715,396 | 12/1987 | Fox . |
| 4,741,365 | 5/1988 | Van Ornum ............... 251/129.16 X |
| 4,793,372 | 12/1988 | Gauthier et al. . |

FOREIGN PATENT DOCUMENTS 1179719 1/1970 United Kingdom .
2064720 6/1981 United Kingdom .

*Primary Examiner*—Gerald A. Michalsky
*Attorney, Agent, or Firm*—Harness, Dickey & Pierce

[57] ABSTRACT

A vacuum regulator for automotive vehicles of the type having a computer-controlled exhaust gas recirculation (EGR) system. The regulator controls the vacuum signal provided to the EGR valve in accordance with the current signal supplied to the regulator by the engine control computer. The vacuum regulator includes a solenoid structure having a secondary air gap in the flux path of the solenoid at the opposite end of the pole piece from the armature. The flux path across the secondary air gap is divided into a first fixed portion and second adjustable portion that is set during calibration of the regulator. The sensitivity of the calibration process is therefore substantially reduced, thereby enabling more accurate settings with less chance of overshooting the desired set point.

24 Claims, 4 Drawing Sheets

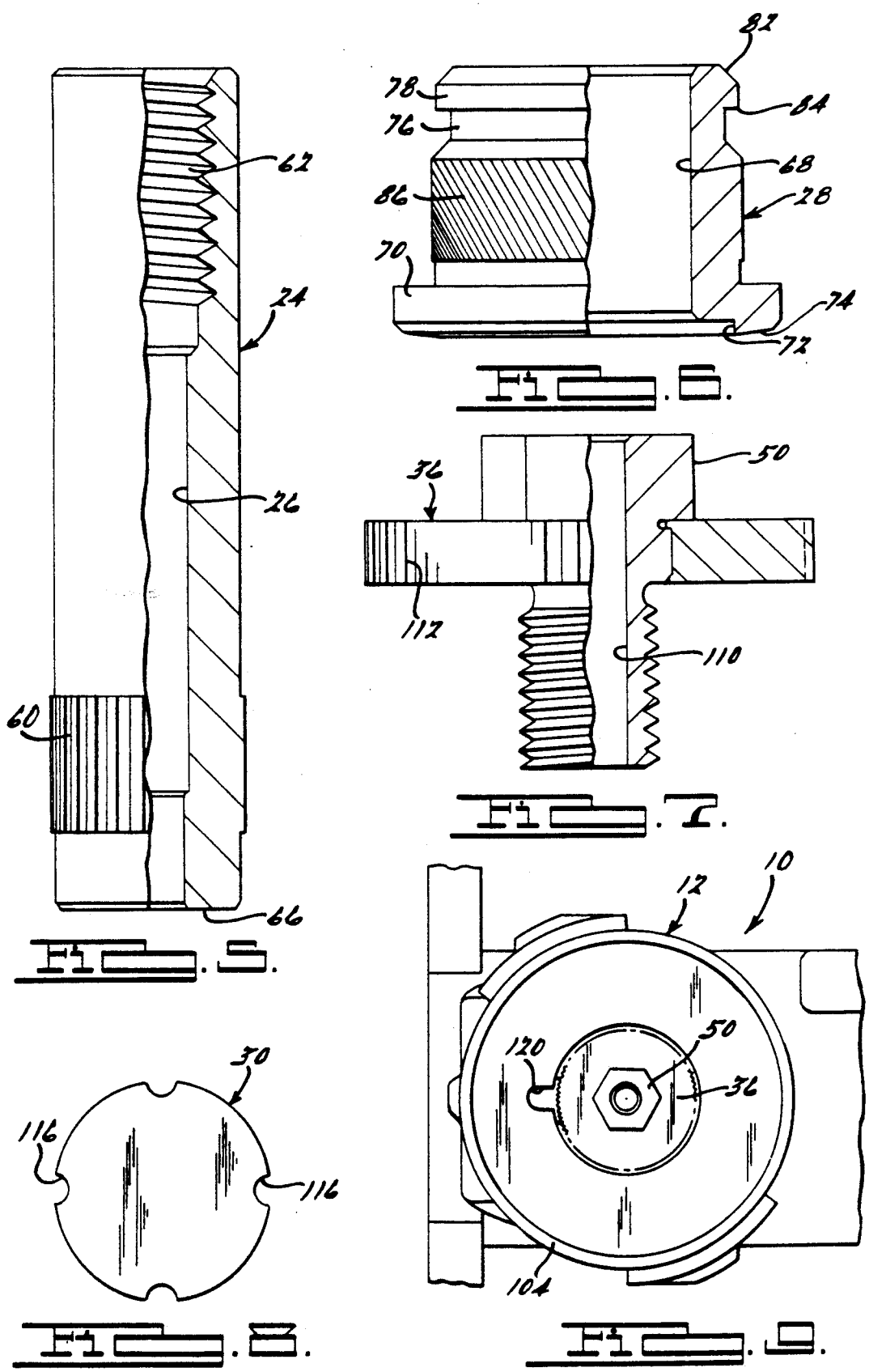

CONSTANT CURRENT VACUUM REGULATOR

This is a continuation of U.S. Pat. No. application Ser. No. 463,470 filed Jan. 10, 1990 now abandoned.

BACKGROUND AND SUMMARY OF THE INVENTION

The present invention relates to proportional solenoid valves and in particular to a vacuum regulator that is particularly adapted for use on automotive vehicles of the type having a computer-controlled exhaust gas recirculation system.

Present day emission equipment on automobiles includes an exhaust gas recirculation, or EGR, system which returns a portion of the exhaust gases to the intake system of the engine. The amount of exhaust gases introduced into the intake system is controlled by a vacuum-actuated EGR valve. The EGR valve is connected between the engine exhaust system and the intake system. The degree of opening of the EGR valve and hence the amount of exhaust gases that are introduced into the intake system is determined by the vacuum signal supplied to the EGR valve. The vacuum signal is regulated by an electrically controlled vacuum regulator valve which is in turn controlled by the engine management computer. In particular, the vacuum regulator is adapted to control the amount of vacuum provided to the EGR valve in accordance with the electrical signal supplied to the regulator by the engine control computer.

Because the vacuum regulator valve is a proportional device, it is important that the regulator be precisely calibrated so that a specified current signal from the engine control computer results in a predetermined amount of negative vacuum pressure being supplied to the EGR valve. Heretofore, vacuum regulators of this type have been calibrated after assembly by energizing the solenoid coil of the regulator with a preselected current signal and adjusting the dimension of the working or primary air gap between the pole piece and the armature until a predetermined vacuum output is achieved. Thereafter, the position of the pole piece and/or the armature is fixed to secure the calibration. A vacuum regulator of this type is disclosed in U.S. Pat. No. 4,567,910 to Slavin et al. and assigned to the assignee of the present invention.

The primary disadvantage of this approach is the highly sensitive nature of the calibration process and the resulting degree of variation in the output of the vacuum regulator to extremely small variations in the actual dimension of the working air gap. Moreover, because of the extremely sensitive nature of the known calibration techniques, it is necessary to perform the calibration adjustment very slowly to avoid overshooting the desired set point. Consequently, the required production time and hence the associate production cost of each unit produced in this manner is increased. In addition, due to such factors as component resiliency, it can be extremely difficult to precisely hold the desired set calibration point, thereby resulting in a unit that produces a different output than that observed when the unit was calibrated.

Accordingly, it is the primary object of the present invention to overcome the disadvantages of the prior art and provide an improved vacuum regulator having a less sensitive means of calibration. In particular, the vacuum regulator according to the present invention is calibrated by adjusting the dimension of a secondary air gap provided in the flux path of the solenoid. Because dimensional variations in the secondary air gap of the solenoid have a less dramatic impact on the operation of the solenoid than dimensional variations in the primary air gap between the pole piece and armature, the sensitivity of the present calibration process is substantially reduced.

In general, this is accomplished by providing a vacuum regulator with a solenoid structure having an adjustable secondary air gap in the flux path of the solenoid at the opposite end of the pole piece from the armature. This allows the primary air gap at the armature end of the pole piece to be set consistently from piece to piece thereby minimizing variations in both the magnetic forces on the armature and in the air flow path through the pole piece and across the face of the armature. Moreover, the secondary air gap provided in the preferred embodiment of the vacuum regulator according to the present invention is designed to divide the flux path of the solenoid so that a portion of the magnetic flux crosses a nonadjustable air gap and the remainder of the flux crosses the adjustable air gap. In this manner, the sensitivity of the calibration process is further reduced, thereby enabling more accurate settings with less chance of overshooting the desired set point. Consequently, the rate of production of vacuum regulators according to the present invention is improved.

Additional objects and advantages of the present invention will become apparent from a reading of the following detailed description of the preferred embodiment which makes reference to the accompanying drawings in which:

BRIEF DESCRIPTION OF THE DRAWINGS

FIG. 5 is a view of the pole piece of the solenoid with half in section and half in elevation.

FIG. 6 is a view of the valve seat member of the solenoid with half in section and half in elevation;

FIG. 7 is a view of the calibration screw and calibration flux collector subassembly of the solenoid with half in section and half in elevation;

FIG. 8 is a plan view of the armature of the solenoid;

FIG. 9 is a top view of the encapsulated housing of the solenoid subassembly with the filter and filter cover removed.

DETAILED DESCRIPTION OF THE PREFERRED EMBODIMENT

Figure 1:
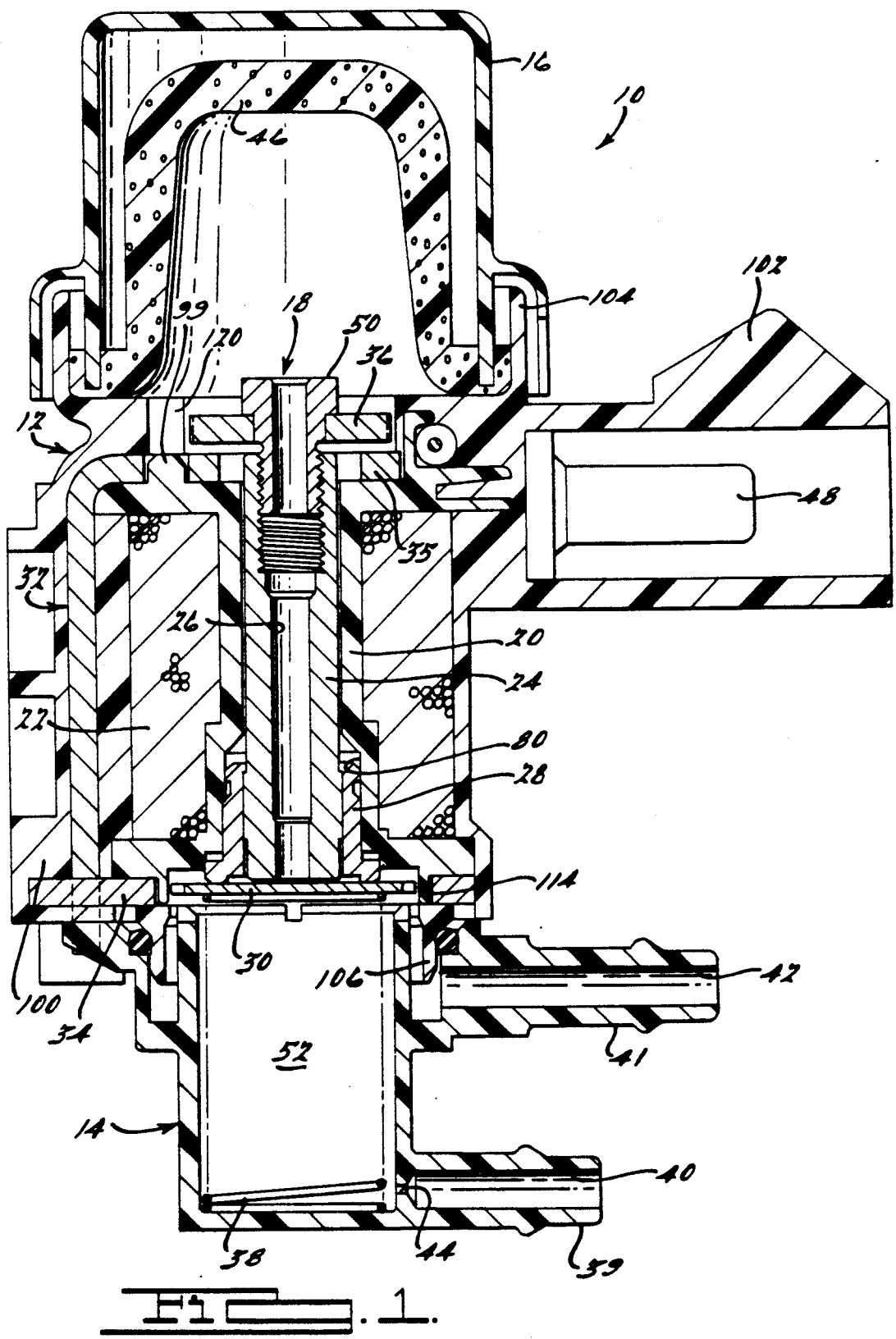
FIG. 1 is a section view of a vacuum regulator according to the present invention.
Figure 2:
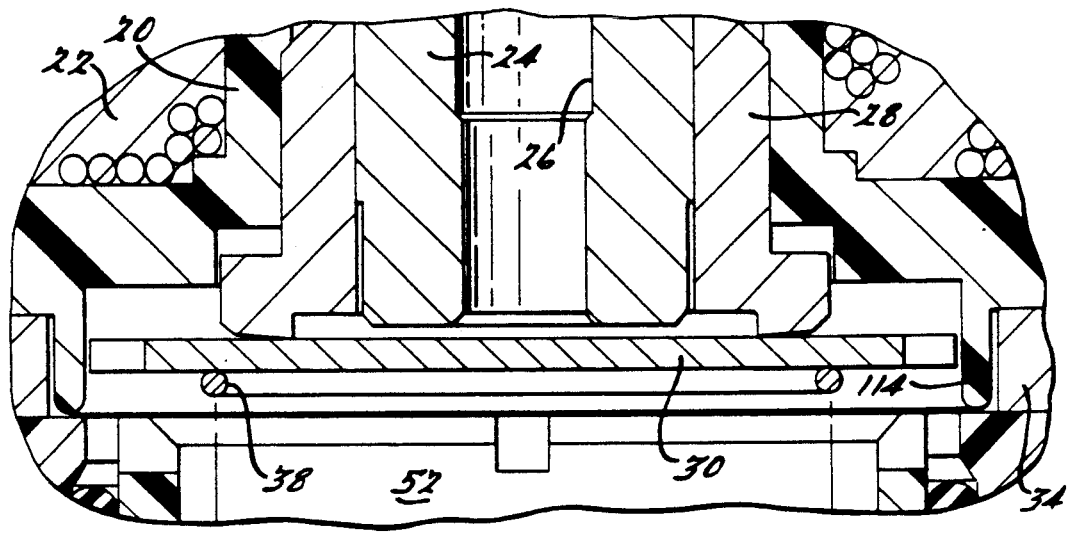
FIG. 2 is an enlarged view of the primary air gap portion vacuum regulator of FIG. 1.

Referring to FIG. 1 of the drawings, a sectional view of an electrically controlled vacuum regulator 10 according to the present invention is shown. The vacuum regulator 10 includes an encapsulated solenoid subassembly 12, a valve housing 14 connected to the bottom of the solenoid subassembly 12, and a filter cover 16 connected to the top of the solenoid subassembly 12. The solenoid subassembly 12 includes a bobbin 20 having a plurality of coil windings 22 wound thereon. A magnetic pole piece 24 extends through the hollow center core of the bobbin 20. The pole piece 24 in turn has a central bore 26 formed therein which serves as an air passageway and communicates with an air inlet 18 at the top of the solenoid subassembly 12. Atmospheric air is admitted into the air inlet 18 through a filter 46 located inside the filter cover 16.

The discharge of atmospheric air from the bottom of the pole piece is controlled by a flat disc-type magnetic armature 30 that is adapted to seat against a nonmagnetic member 28 surrounding the lower end of the pole piece 24 and defining an annular valve seat. In the preferred embodiment, the seat member 28 is made of brass.

Surrounding the armature 30 is an annular-shaped magnetic flux collector ring 34 that is connected to a magnetic L-frame member 32. The L-frame member 32 includes an annular-shaped upper segment 35 that surrounds the top of the pole piece 24. An additional magnetic flux collector member 36 is spaced slightly from the top of the upper segment 35 of L-frame member 32, as well as from the top of pole piece 24, and is threadedly attached to the top of pole piece 24 via a nonmagnetic calibration screw 50. Thus, when the solenoid is energized by current flow through the coil windings 22, the magnetic flux path of the solenoid 12 is defined by the pole piece 24, the armature 30, flux collector ring 34, L-frame member 32 including upper segment 35 thereof, and flux collector member 36. The primary or working air gap of the solenoid assembly 12 is defined by the axial distance between the bottom face of the pole piece 24 and the armature 30. In addition, a secondary air gap in the flux path is created at the opposite end of the pole piece 24 and includes a nonadjustable portion defined by the radial distance between the pole piece 24 and the upper segment 35 of L-frame member 32, as well as an adjustable portion defined by the axial distance between the top end face of pole piece 24 and the flux collector member 36, as well as the axial distance between the flux collector member 36 and the upper segment 35 of L-frame member 32.

The valve housing 14 connected to the bottom of the solenoid subassembly 12 defines a chamber 52 below the armature 30 that communicates with central passageways 40 and 42 formed in a pair of laterally projecting connectors 39 and 41, respectively. Connector 39 is adapted to be connected via suitable tubing (not shown) to a source of full vacuum from the intake manifold of the engine. Connector 41 is adapted to be connected via similar tubing to the exhaust gas recirculation, or EGR, valve (also not shown). The coil windings 22 of the solenoid assembly 12 are in turn connected to the engine control computer via terminals 48. A helical spring 38 is located in the chamber 52 of the valve housing 14 for biasing the armature 30 against the annular valve seat 28.

When the engine of a vehicle equipped with the vacuum regulator 10 according to the present invention is not in operation, the spring 38 holds the armature valve 30 against the valve seat 28 to thereby close the air passage 26 through the pole piece 24. However, when the vehicle is in operation, a negative vacuum pressure is introduced into chamber 52 of valve housing 14 through the flow-restrictive orifice 44 in the passageway 40, thereby tending to pull the armature 30 away from the valve seat 28. Simultaneously, the engine control computer energizes the solenoid 12 thereby exerting an attractive force between the pole piece 24 and the armature 30 in opposition to the effect of the vacuum from the intake manifold. The amount of vacuum, and hence the "vacuum signal", provided to the EGR valve via passageway 42, is therefore controlled by the degree to which the armature valve 30 is attracted toward the valve seat 28.

In particular, the sum of the forces exerted on the armature valve 30 by the spring 38 plus the magnetic attraction of the armature toward the pole piece 24 is equal to the product of the vacuum pressure in the chamber 52 times the cross-sectional area of the valve 30. Therefore, as the magnetic attraction force on armature valve 30 increases, the level of vacuum pressure in chamber 52 increases. Similarly, as the magnetic attraction force on the armature valve 30 decreases, the level of vacuum pressure in chamber 52 decreases. Accordingly, by controlling the magnetic force exerted on the armature valve 30, which is in turn controlled by the amount of current supplied to the solenoid 12, it is possible for the engine control computer to control the amount of negative vacuum pressure or the "vacuum signal" provided to the EGR valve. As previously noted, the degree of vacuum pressure provided to the EGR valve determines the amount of exhaust gases that are introduced into the intake system of the engine.

Referring additionally to FIGS. 2-9, a more detailed description of the solenoid subassembly 12 as well as the preferred manner in which the solenoid subassembly is constructed and calibrated according to the present invention will now be explained.

Figure 3A:
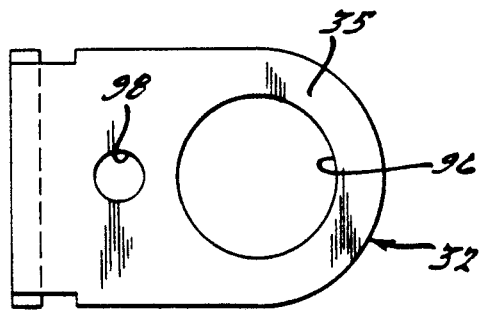
FIGS. 3a-3b are top and side plan views, respectively, of the L-frame flux collector member of the solenoid.
Figure 3B:
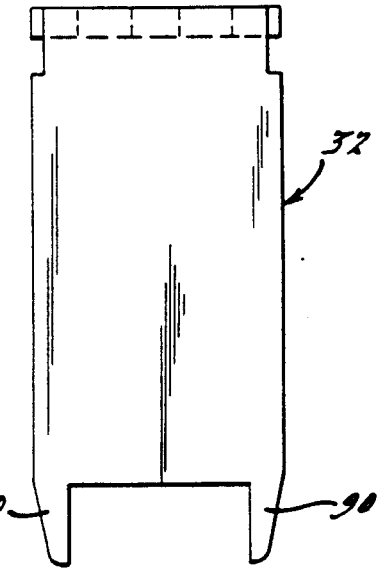
Figure 4:
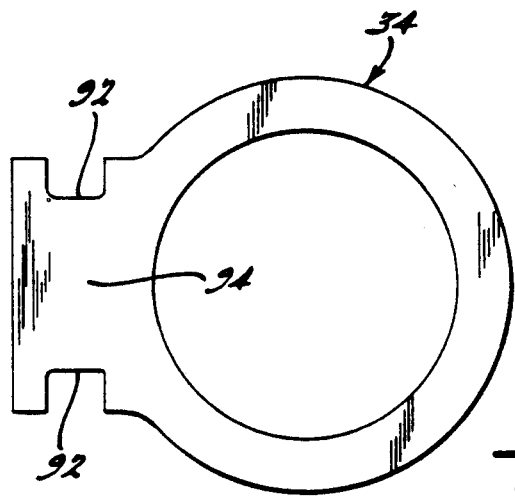
FIG. 4 is a plan view of the flux collector ring of the solenoid.

Initially, the bobbin 20, which is made of a durable nonmagnetic plastic resin material, such as nylon, is wound with coil wire 22 and the ends of the coil windings are terminated and electrically connected to a pair of terminals 48. The flux collector ring 34 is installed on the bottom of the bobbin 20 and the L-frame member 32 is installed with upper segment 35 thereof placed over the top of the bobbin 20. As best shown in FIGS. 3a-3b and 4, the lower segment of L-frame member 32 has a pair of depending tabs 90 which are adapted to mate with corresponding recesses 92 formed on opposite sides of the tab portion 94 of ring member 34, thereby mechanically joining L-frame member 32 to ring member 34. To ensure that the hole 46 formed in the upper segment 35 of the L-frame member 32 is properly aligned with the central axis of the bobbin 20, a locating hole 98 is provided in the upper segment 35 which is adapted to receive the locating pin 99 integrally formed on the top of the bobbin.

With the flux collecting members 32 and 34 joined to the wound bobbin 20, the entire subassembly is encapsulated in an injection mold which forms the outer housing 100 of the solenoid subassembly 12. The injection molding process completely encloses and seals the solenoid subassembly 12 while simultaneously forming the connector 102, the seating flange 104 for the filter cover 16, and the lower connecting flange 106 for mating with the valve housing 14.

As noted above, the magnetic pole piece 24, which in the preferred embodiment is made of steel, has a longitudinal bore 26 formed therein which serves as an air passageway through which atmospheric air is discharged into the chamber 52 of the valve housing 14 when the armature valve 30 is open. The size of the bore 26 toward the upper end of the pole piece 24 is enlarged and has an internal thread 62 (FIG. 5) formed therein for receiving the calibration screw 50. Preferably, a section of straight knurling 60 is provided on the outer surface of a slightly enlarged portion of the pole piece 24 toward its lower end to enhance the frictional bond between the pole piece and the valve seat 28.

In particular, the nonmagnetic valve seat 28, which in the preferred embodiment is made of brass, has a central bore 68 (FIG. 6) formed therein having a diameter equal to the outside diameter of the pole piece 24. Thus when the pole piece 24 is inserted into the bore 68 of the valve seat 28, the slightly oversized knurled section 60 of the pole piece 24 will embed into the inner walls of the valve seat bore 68 thereby creating a tight frictional bond between the two parts. This is important because the axial distance between the bottom face 66 of the pole piece 24 and the bottom annular surface 74 of the valve seat 28 determines the working air gap between the pole piece 24 and the armature 30 in the closed valve position of the fully assembled device.

The lower portion of the valve seat member 28 has an enlarged annular flange 70 which accommodates an enlarged shallow counterbore 72 formed in the bottom face of the valve seat member 28. The resulting annular-shaped face 74 comprises the actual valve seat and is machined in the preferred embodiment with a slight radially outward back taper to provide a circular "line" seal with the flat disc armature valve 30. During assembly, the valve seat member 28 is installed on the lower end of the pole piece 24 in a fixture that automatically sets the axial position of valve seat surface 74 relative to the end face 66 of the pole piece. In this manner, the primary air gap of the present vacuum regulator remains constant from unit to unit. In the preferred embodiment, the air gap distance is set between 0.008-0.010 inches.

The combined pole piece 24 and seat 28 subassembly is then inserted into the enlarged bore section 80 (FIG. 2) of the bobbin 20 until the top of the pole piece 24 is substantially flush with the top surface of the upper segment 35 of L-frame member 32. The radial distance established between the pole piece 24 and the annular-shaped upper segment 35 of the L-frame member 32 defines a secondary air gap in the flux path of the solenoid 12.

To enhance the frictional bond between the seat member 28 and the bobbin 20, the outer diameter of the seat member 28 is formed slightly larger than the enlarged bore section 80 of the bobbin 20. In addition, the top portion of the seat member 28 includes a reduced diameter neck portion 76 which defines a flange 78 having its top outer edge 82 chamferred to facilitate installation of the seat member into the bore 80 of the bobbin 20, and its bottom outer edge 84 defining a barb-like edge which "bites" into the wall of the bobbin 20 to resist withdrawal from the bore 80. Furthermore, the main body portion of the seat member 28 preferably has knurling 86 formed around its outer surface to further enhance the frictional bond between the bobbin 20 and the seat member 28. Since the bobbin 20 in the preferred embodiment is made from a nylon-type material, slight deformation of the walls of bore 80 of the bobbin 20 occurs during installation of the pole piece 24 and seat member 28 subassembly. The elasticity of the bobbin material thus serves to tightly grip the inserted pole piece/seat member subassembly. Note, the tight seal formed between the bobbin 20 and the flange 78 of the seat member 28 also serves to prevent the leakage of atmospheric air around the outside of the seat member 28 into the chamber 52.

Turning now to FIG. 7, the magnetic calibration flux collector 36, which in the preferred embodiment is made of steel, is press fit onto a nonmagnetic calibration screw 50, preferably made of brass, until the flux collector 36 is flush against the head of the screw. Optionally, the neck of the screw 50 may be provided with vertical knurling to enhance the frictional bond between the two components. The calibration screw 50 also has a central bore 110 formed therethrough for providing the air inlet 18 into the air passageway defined by the central bore 26 in the pole piece 24. In addition, the outer radial surface of the calibration flux collector 36 is corrugated, as shown at 112, the purpose of which will be subsequently described. The calibration screw 50 is then threaded into the top of the pole piece 24 until the calibration flux collector 36 is spaced slightly from the upper segment 35 of L-frame member 32, thereby supplementing the flux path across the secondary air gap between the top of the pole piece 24 and the annular-shaped upper segment 35 of the L-frame member 32. It should be noted that, in the preferred embodiment, the diameter of the calibration flux collector 36 is such that it overlays the upper segment 35 of the L-frame member 32 so that the supplemental adjustable air gap created between the flux collector 36 and the upper segment 35, as well as between the flux collector 36 and the pole piece, is parallel to the axis of the pole piece 24.

Finally, the armature 30 is disposed within the circular-shaped cavity defined by an annular wall 114 (FIG. 2) integrally formed on the bottom of the bobbin 20. The inside diameter of the annular wall 114 is slightly greater than the diameter of the armature 30 to confine lateral movement of armature. To facilitate air flow around the periphery of the armature 30 between the armature and the wall 114, the armature preferably has a plurality of equally radially-spaced notches 116 formed around its periphery, as shown in FIG. 8. Optionally, and/or alternatively, grooves may be formed in the interior surface of the wall 114 to accomplish the same purpose. The spring 38 is then installed in the chamber 52 of the valve housing 14 and the valve housing secured to the mounting flange 106 of the encapsulated solenoid subassembly 12.

Once assembled, the vacuum regulator 10 is ready to be calibrated. In order to calibrate the device, the terminals 48 are connected to an electrical current source, connector 39 is connected to a source of vacuum, and connector 41 is connected to a vacuum gauge. A predetermined current signal is applied to terminals 48 and a predetermined negative vacuum pressure is applied through passageway 40, restrictive orifice 44, into chamber 52. The calibration screw 50 is then rotated clockwise or counterclockwise, as appropriate, to vary the reluctance in the flux path of the solenoid 12 until the vacuum gauge communicating with outlet passage 42 registers the desired vacuum pressure signal. In particular, by adjusting calibration screw 50, the axial position of calibration flux collector 36 relative to pole piece 24 and to upper segment 35 of L-frame member 32, and hence the size of the supplemental portion of the secondary air gap in the flux path of the solenoid, is varied. Moreover, as will be appreciated by those skilled in the art, since the flux path at the top of the solenoid assembly 12 has been divided into the two paths—the first across the fixed radial air gap between pole piece 24 and upper segment 35 and the second across an adjustable air gap between flux collector 36 and pole piece 24 as well as upper segment 35—the adjustment of calibration flux collector 36 affects the reluctance in only a portion of the flux path, thereby making the adjustment less sensitive and thus allowing for greater accuracy with less chance of overshooting the desired set point.

Figure 10:
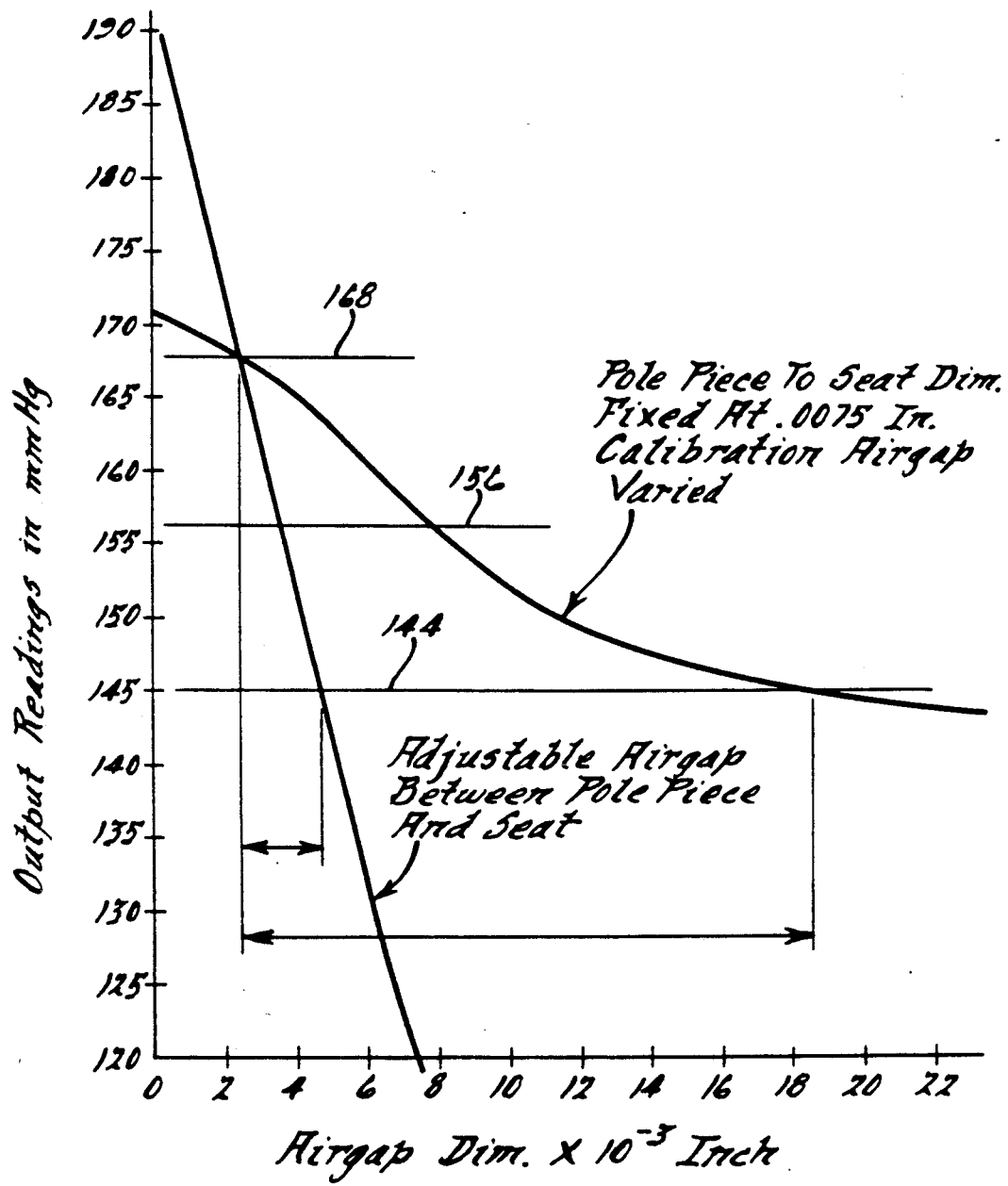
FIG. 10 is a graph illustrating the sensitivity of the calibration process of the vacuum regulator of FIG. 1.

This advantage of the present invention is graphically illustrated in FIG. 10 which compares the output characteristics of a vacuum regulator with an adjustable air gap between the pole piece and the armature and a vacuum regulator according to the present invention wherein the primary air gap is fixed. Assuming a desired nominal output of 156 mm of mercury (Hg) and an acceptable tolerance range of 12 mm Hg, it can be seen that with the prior art vacuum regulator, the primary air gap must be set within a tolerance range of approximately 0.001 inches, whereas with the vacuum regulator according to the present invention, the calibration flux collector 36 need be set within a tolerance range of only approximately 0.008 inches.

Lastly, once the desired calibration set point is established, a drop of an ultraviolet-cured polymer adhesive is applied to the pocket 120 (FIG. 9) formed in the top of the housing 100 adjacent the calibration flux collector 36. In addition to providing an adhesive bond, the UV-cured polymer when hardened serves as a "key" lock to mechanically prevent further movement of the flux collector 36 relative to the housing 100 due to the mechanical interference created between the hardened polymer and the corrugated outer surface 112 of the flux collector 36. Alternative means for securing the calibrated set point are, of course, possible.

Finally, it is to be noted that the vacuum regulator 10 according to the present invention may be calibrated before assembly of the valve housing 14 to the solenoid subassembly 12. In particular, the solenoid subassembly 12 may be installed on a calibration fixture that includes a chamber, spring, and armature. However, the initially described approach is preferred as it compensates for any possible variations in performance attributable to differences in the characteristics of the ararmature 30 and spring 38.

While the above description constitutes the preferred embodiment of the invention, it will be appreciated that the invention is susceptible to modification, variation, and change without departing from the proper scope or fair meaning of the accompanying claims.

What is claimed is:

1. An electromagnetic solenoid valve assembly comprising:
   a valve housing defining a fluid chamber;
   a fluid passageway communicating with said fluid chamber;
   a magnetic pole piece having a top and a bottom end;
   a seat member extending beyond the bottom end of said pole piece;
   a magnetic closure member located a predetermined distance from the bottom end of said pole piece and adapted to control the flow of fluid through said fluid passageway, said predeteremined distance between said magnetic closure member and the bottom end of said pole piece defining a primary air gap in the magnetic flux path of the solenoid;
   first flux collector means for completing the magnetic flux path from the top end of said pole piece to said magnetic closure member, said first flux collector means defining a secondary air gap in said magnetic flux path at the top end of said pole piece between said pole piece and said first flux collector means and hence a first flux path across said secondary air gap;
   adjustable flux collector means defining a supplemental flux path across aid secondary air gap in parallel with said first flux path;
   means for establishing the flow of electromagnetic flux through said flux paths; and
   calibration means for varying the position of said adjustable flux collector means relative to said first flux collector means to vary the reluctance in said supplemental flux path.

2. The solenoid valve assembly of claim 1 wherein said first flux collector means includes an upper magnetic segment that surrounds the top end of said pole piece.

3. The solenoid valve assembly of claim 2 wherein said solenoid has associated therewith an axis aligned with said pole piece and further wherein said upper magnetic segment is annular shaped and the secondary air gap is defined by the radial distance between said upper magnetic segment and said pole piece.

4. The solenoid valve assembly of claim 3 wherein said adjustable flux collector means comprises a magnetic member located adjacent to the top end of said pole piece and to said upper magnetic segment.

5. The solenoid valve assembly of claim 4 wherein said calibration means is adapted to vary the axial position of said adjustable flux collector means relative to said upper magnetic segment.

6. The solenoid valve assembly of claim 5 wherein said calibration means comprises a nonmagnetic screw that is fixedly connected to said adjustable flux collector means and threadedly engaged to the top of said pole piece.

7. The second valve assembly of claim 5 wherein said adjustable flux collector means comprises a substantially disc-shaped magnetic member that overlays the top end of said pole piece and at least a part of said annular-shaped upper magnetic segment.

8. The solenoid valve assembly of claim 5 wherein the calibrated position of said adjustable flux collector means is secured with a light-cured polymer adhesive 9. A proportional solenoid valve assembly adapted to be connected into a fluid circuit for controlling the pressure in said fluid circuit in accordance with an electrical signal provided to the solenoid, including:
   a valve housing defining a fluid chamber adapted to be connected to said fluid circuit for communication therewith;
   a magnetic pole piece having a top end and a bottom end and defining a fluid passageway having an inlet port adjacent said top end and an exit port adjacent said bottom end in communication with said fluid chamber;
   a nonmagnetic seat member extending beyond the bottom end of said pole piece;
   a flat disc-type magnetic armature located a predetermined distance from the bottom end of said pole piece and adapted to control the flow of fluid out of said exit port into said fluid chamber, said predetermined distance between the bottom end of said pole piece and said armature defining a primary air gap in the magnetic flux path of the solenoid;
   flux collector means for completing the return magnetic flux path from the top end of said pole piece to said armature including a first annular portion surrounding said armature, a second portion adjacent the top end of said pole piece and defining a secondary air gap in the magnetic flux path of the solenoid corresponding to the radial distance between said pole piece and said second portion, and a third portion connecting said first and second portions;

an adjustable flux collector member spaced from and overlaying the top end of said pole piece and at least a part of said second portion for defining a supplemental flux path across said secondary air gap;

means for establishing the flow of electromagnetic flux through said flux path;

calibration means associated with said adjustable flux collector member for varying the position of said adjustable flux collector member relative to said pole piece and said second portion for varying the reluctance of said supplemental flux path.

10. The proportional solenoid valve of claim 9 wherein said solenoid has associated therewith an axis aligned with said pole piece and wherein said calibration means is adapted to vary the axial distance between the top of said pole piece and said adjustable flux collector member.

11. The proportional solenoid valve of claim 10 wherein said calibration means is further adapted to simultaneously vary the axial distance between said second portion and said adjustable flux collector member.

12. The proportional solenoid valve of claim 11 wherein said calibration means comprises a nonmagnetic screw that is fixedly connected to said adjustable flux collector member and threadedly engaged to the top of said pole piece.

13. The proportional solenoid valve of claim 12 wherein said adjustable flux collector member comprises a substantially disc-shaped member having a central bore for receiving said calibration screw.

14. The proportional solenoid valve of claim 13 wherein said second portion surrounds the top end of said pole piece and the top of said pole piece is substantially flush in the axial direction with said second portion.

15. The proportional solenoid valve of claim 13 wherein the calibrated position of said adjustable flux collector member is secured with a curable material that is applied in a flowable state.

16. In an electromagnetic solenoid valve assembly comprising a plurality of magnetic segments defining a flux path including a pole piece, an armature spaced from one end of the pole piece so as to define a primary air gap therebetween, and flux collector means for completing the return magnetic flux path from said armature to the other end of said pole piece including an upper magnetic segment located adjacent to the other end of said pole piece, and means for establishing the flow of electromagnetic flux through said flux path; the improvement comprising:

a secondary air gap in said magnetic flux path at the other end of said pole piece between said upper magnetic segment and said pole piece;

a first flux path across said secondary air gap from said pole piece to said upper magnetic segment; and an adjustable magnetic segment located adjacent to the other end of said pole piece and adjacent to said upper magnetic segment for creating a supplemental flux path across said secondary air gap in parallel with said first flux path from said pole piece through said adjustable magnetic segment to said upper magnetic segment;

the position of said adjustable magnetic segment relative to said upper magnetic segment being adjustable to vary the reluctance in said supplemental flux path.

17. The solenoid valve assembly of claim 16 wherein said upper magnetic segment substantially surrounds the other end of said pole piece and said secondary air gap is defined by the radial distance between said upper magnetic segment and said pole piece.

18. The solenoid valve assembly of claim 17 wherein said solenoid has associated therewith an axis aligned with said pole piece and further wherein said adjustable magnetic segment is axially spaced from and overlays the other end of said pole piece and at least a part of said upper magnetic segment.

19. The solenoid valve assembly of claim 18 wherein the axial position of said adjustable magnetic segment relative to the other end of said pole piece and to said upper magnetic segment is adjustable.

20. The solenoid valve assembly of claim 19 further including a nonmagnetic screw fixedly connected to said adjustable magnetic segment and threadedly engaged to the other end of said pole piece.

21. The solenoid valve assembly of claim 16 wherein the calibrated position of said adjustable magnetic segment is secured by a curable material that is applied in a flowable state.

22. The method of calibrating an electromagnetic solenoid valve assembly having a plurality of magnetic segments defining a flux path including a pole piece defining the axis of the assembly, an armature spaced from one end of the pole piece so as to define a primary air gap therebetween, and flux collector means for completing the return magnetic flux path from said armature to the other end of said pole piece including an upper magnetic segment radially spaced from the other end of said pole piece and an adjustable magnetic segment axially spaced from said upper magnetic segment, and means for establishing the flow of electromagnetic flux through said flux path, comprising the steps of:

creating a first magnetic flux path at said other end of said pole piece that includes a fixed secondary air gap across the radial space between said upper magnetic segment and said pole piece;

creating a second magnetic flux path across aid secondary air gap in parallel with said first flux pat that includes an adjustable air gap across the axial space between said adjustable magnetic segment and said upper magnetic segment; and axially adjusting the position of said adjustable magnetic segment relative to said upper magnetic segment so as to vary the reluctance in said second magnetic flux path.

23. The method of claim 22 further including the step of securing the calibrated position of said adjustable magnetic segment.

24. The method of claim 23 wherein said securing step is performed by applying a light-curable polymer adhesive to said adjustable magnetic segment and thereafter exposing said polymer adhesive to light.

* * * * *

UNITED STATES PATENT AND TRADEMARK OFFICE
CERTIFICATE OF CORRECTION

PATENT NO. : 5,065,979
DATED : November 19, 1991
INVENTOR(S) : Charles A. Detweiler et al.

It is certified that error appears in the above-identified patent and that said Letters Patent is hereby corrected as shown below:

ON THE TITLE PAGE, under "Related U.S. Application Data", "463,470" should be --463,490--.

Column 8, line 4, claim 1, "aid" should be --said--.

Column 8, line 35, claim 7, "second" should be --solenoid--.

Column 8, line 42, claim 8, after "adhesive", insert --.--.

Column 9, line 37, claim 13, after "screw", insert --.--.

Column 10, line 50, claim 22, "pat" should be --path--.

Signed and Sealed this

Sixth Day of April, 1993

Attest:

STEPHEN G. KUNIN

*Attesting Officer*          *Acting Commissioner of Patents and Trademarks*